Figure 1:
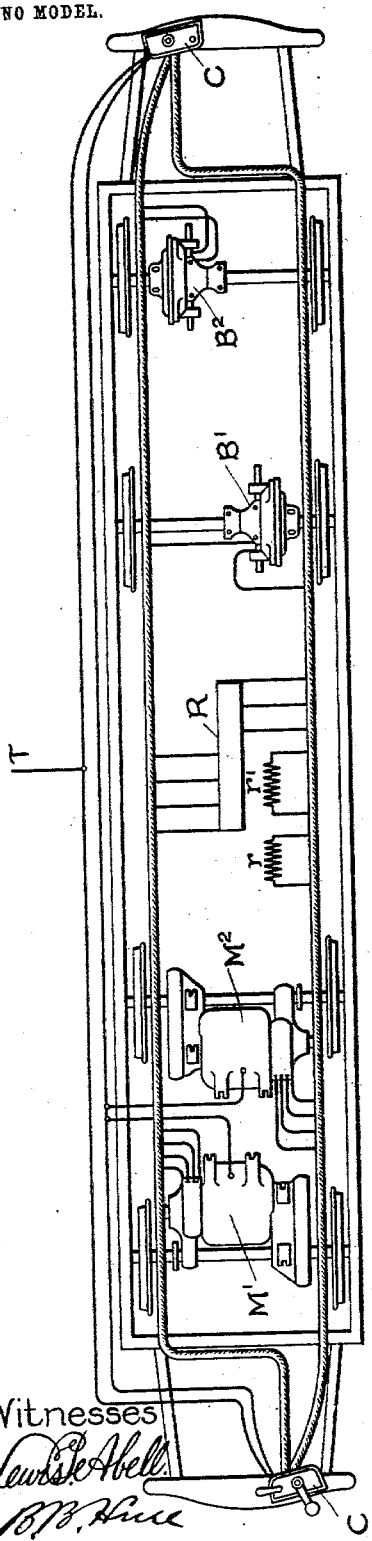

No. 739,588. PATENTED SEPT. 22, 1903.
F. E. CASE.
ELECTRIC BRAKING.
APPLICATION FILED JULY 6, 1900.
NO MODEL. 2 SHEETS—SHEET 1.

Witnesses
Lewis P. Abell
B. B. Hull

Inventor.
Frank E. Case,
by Albert G. Davis
Atty.

No. 739,588. PATENTED SEPT. 22, 1903.
F. E. CASE.
ELECTRIC BRAKING.
APPLICATION FILED JULY 6, 1900.
NO MODEL. 2 SHEETS—SHEET 2.

Witnesses: Inventor:
Frank E. Case,
by Albert G. Davis
Atty.

No. 739,588. Patented September 22, 1903.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

ELECTRIC BRAKING.

SPECIFICATION forming part of Letters Patent No. 739,588, dated September 22, 1903.

Application filed July 6, 1900. Serial No. 22,714. (No model.)

*To all whom it may concern:*

Be it known that I, FRANK E. CASE, a citizen of the United States, residing at Schenectady, county of Schenectady, State of New York, have invented certain new and useful Improvements in Electric Braking, of which the following is a description.

My invention relates to a system of electric braking in which electrically-actuated brakes on a car or train are supplied with current from the propelling-motors operating as momentum-driven generators, and has for its object to equalize the braking effect on the different trucks of the car or train. It is applicable either when the brakes are mounted on the free axles of a motor-car or when they are located on a trail-car and supplied with current from the motors on the motor-car. The braking effect of motors operating as momentum-driven generators is directly proportional to the current generated. On the other hand, the braking effect of electrically-actuated brakes depends not only upon the current supplied to actuate them, but also upon the speed at which the car or train is running, the coefficient of friction between the brake members decreasing rapidly with increase in speed. When, therefore, it is attempted to brake a car or train by means of the motors operating as momentum-driven generators to supply current to electrically-actuated friction-brakes, if the brakes are so proportioned that at high speed with a given current the braking effects of the motors and brakes are equal at low speeds with the same current the braking effect due to the brakes will be largely increased over that due to the motors, and, conversely, if the brakes are so proportioned that at low speeds with a given current the braking effects of the motors and brakes are equal at high speeds with the same current the braking effect of the brakes will be considerably less than that of the motors. In order to avoid skidding of the wheels, it has been heretofore customary to so proportion the actuating-windings of the brakes that at low speeds when the coefficient of friction between the brake members is greatest the braking effect of the brakes will be substantially equal to that of the motors. Such a proportioning of the windings is objectionable, for the reason that it renders the braking effect at high speeds much less than it should be for most efficient braking.

By my invention I provide means by which the brakes may be more strongly energized at high than at low speeds with substantially the same amount of current flowing through the motors, and I am thus enabled to obtain substantially the same braking effect at the brakes and at the motors both at low and at high speeds.

My invention will be better understood by reference to the following description, taken in connection with the accompanying drawings, while its scope will be pointed out in the appended claims.

Figure 3:
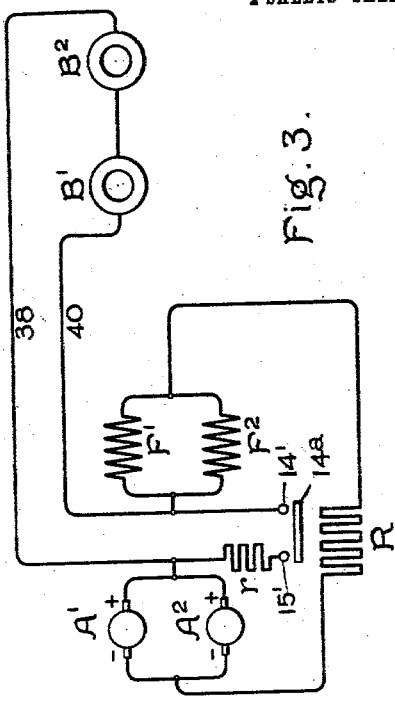
Figure 2:
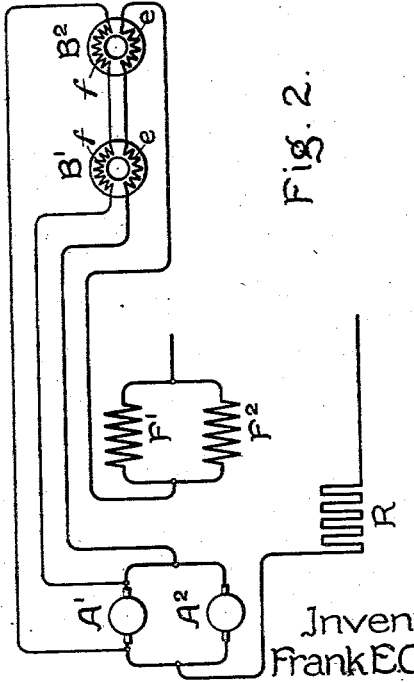
Figure 4:
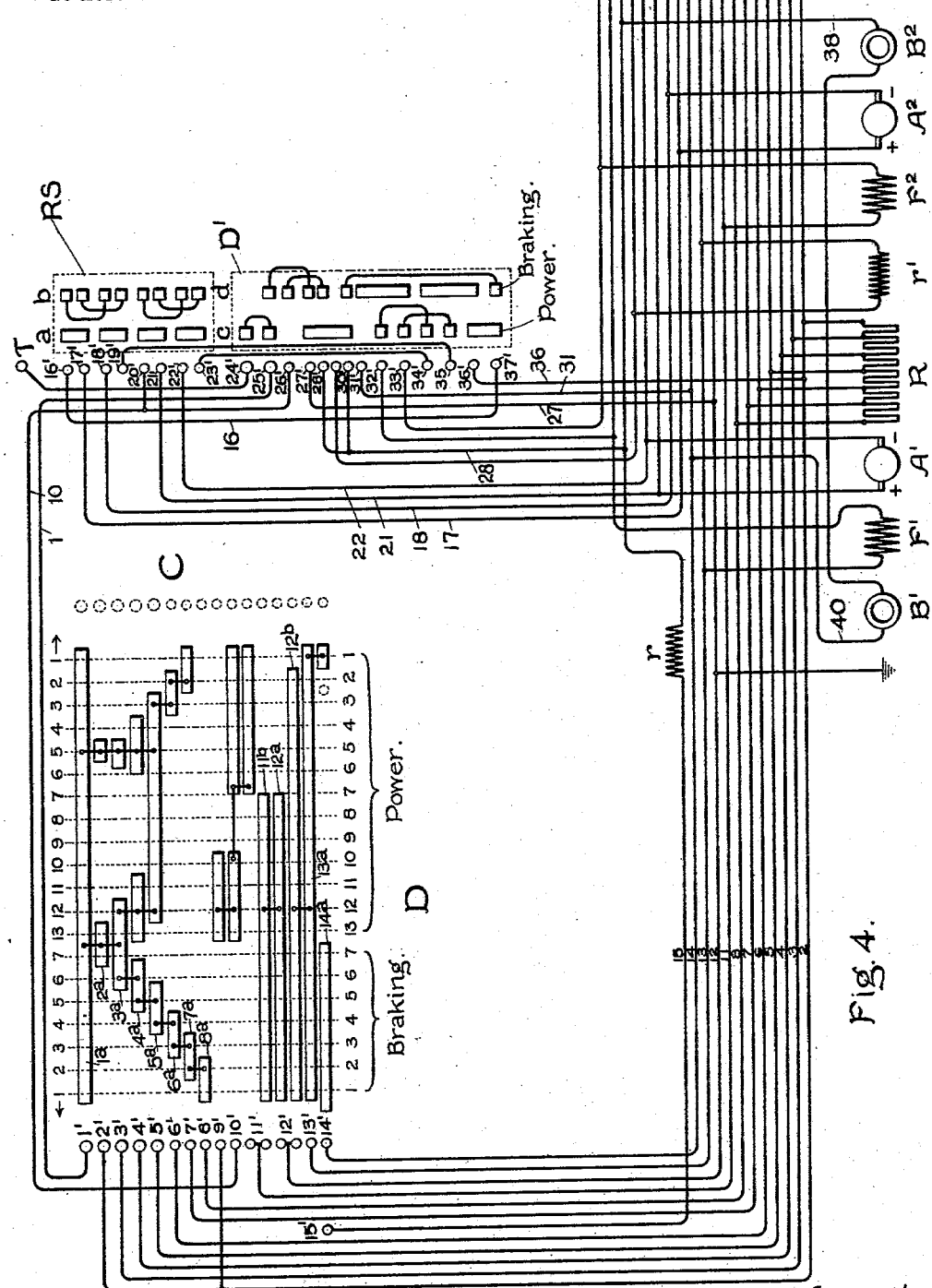

In the drawings, Figure 1 shows one arrangement of the motors and brake-shoes (on a single car) to which my invention may be advantageously applied. Fig. 2 shows diagrammatically one of the embodiments of my invention. Fig. 3 shows a modified arrangement, and Fig. 4 shows in development a controller adapted to make the circuit connections shown in the diagram of Fig. 3.

In Fig. 1, M' and M² indicate propelling-motors mounted on one truck of a double-truck car, and B' and B² electromagnetic brakes on the other truck. Besides the motors and the brakes the car is provided with the usual regulating resistance R and with auxiliary resistances $r$ and $r'$, the function of which will be hereinafter described. Controllers C, located one at each end of the car, operate to control the motors both when supplied with power from the trolley connection T and when operated as momentum-driven generators to supply current to the brakes B' and B². The brakes shown in the drawings are of the disk type, having one member (hereinafter called the "shoe") surrounding the car-axle and fixed with respect thereto and the other member arranged in proximity thereto and slidingly mounted on the car-axle, but not rotatable thereon.

Figs. 2 and 3 show two different arrangements for carrying out my invention. In Fig. 2, which is a diagram of the circuits completed by the controller in its braking positions, A' and F', indicate, respectively, the armature and field windings of the motor M', and $A^2$ and $F^2$ the corresponding elements of the motor $M^2$. B′ and $B^2$ indicate the brake-shoes. These shoes are provided with windings $e$, connected directly in circuit with the motor-windings. R is a variable resistance included in the motor-circuit and operating to regulate the braking action. The arrangement thus far described is well known in the art and constitutes no part of my present invention.

My invention consists in providing the brake-shoes with auxiliary shunt-windings arranged in a circuit connected directly across the terminals of the motor-armatures. These auxiliary windings are indicated in the drawings by the letters $ff$. The excitation due to these shunt-windings is evidently directly proportional to the potential generated in the motor-armatures, and this potential for any definite current in the motor-circuit is directly proportional to the speed of the car. When the speed is greatest, the shunt-windings will produce a maximum magnetization, and as the speed falls off the current in the shunt-windings, and consequently their magnetizing effect, will decrease. Since the coefficient of friction between the members of the brake-shoes increases as the speed of the vehicle decreases and since the magnetizing effect of the shunt-windings of the brake-shoes decreases with the speed, the effect of the shunt-windings may be made to compensate for variation in the coefficient of friction between the brake members. This evidently demands such a proportioning of the shunt-winding that the braking effect of the brake-shoes with a certain definite current flowing in the series winding of the brake will be substantially constant irrespective of the speed of the vehicle. The proper proportioning for any one case depends evidently on the size of the brake-shoes and material of which they are constructed and may be determined by calculation if the data with respect to the construction is known, or by experiment in any case.

In Fig. 3 I accomplish the same result by using the ordinary brake-shoes having their windings connected directly in the motor-circuit and shunting these windings by a resistance in the last braking positions of the controller. When this arrangement is used, the windings of the shoes should be so proportioned that the braking effect at high speeds will be substantially equal to that of the motors. At low speeds the magnetization of the brake-shoes for any given current in the motor-circuits is reduced sufficiently to prevent slipping by diverting a portion of the current supplied by the motors from the windings of the brake-shoes.

For making the connections shown in Fig. 2 the ordinary braking-controller now in common use may be employed, it being necessary only to add contacts to the controller, permanently connecting the shunt-windings $f$ of the brake-shoes across the motor-terminals in all the braking positions of the controller. For making the connections illustrated in Fig. 3 the ordinary controller must be provided with additional contacts for connecting the resistance in shunt to the brake-shoes in the last braking positions.

In order to render the description more complete, I have illustrated in Fig. 4 a controller properly connected to the motor and brake circuits and provided with the additional contacts necessary for making the connections shown in Fig. 3. The necessary changes required to be made to adapt the controller to make the connections shown in Fig. 2 will be obvious to one skilled in the art.

Referring to Fig. 4, A′ and $A^2$ represent, as before, the motor-armatures, and F′ and $F^2$ their field-windings. B′ and $B^2$ represent the brake-shoes, R the main regulating resistance, and $r$ the auxiliary resistance used for shunting the brake-shoes in the last braking positions of the controller. C indicates a controller comprising the three cylinders D, D′, and RS, carrying movable contacts adapted to coöperate with the corresponding fixed contacts 1′ to 37′. The contacts of the controller-cylinders are shown developed on a plane surface, as is customary in illustrating such structures. The cylinder RS is the reversing-switch cylinder. It is provided with two sets of movable contacts $a$ and $b$, adapted to engage with fixed contacts 16′ to 23′, inclusive. When the contacts of one of these sets are moved into engagement with the corresponding fixed contacts, the armatures and fields of the respective motors are connected in one circuit relation, and when the contacts of the other set are brought into engagement with the fixed contacts the motor-circuits are reversely connected. The cylinder D is used both for power and for braking, the positions numbered 1 to 7, inclusive, on the left being braking positions and the positions 1 to 13, inclusive, on the right being power positions. The cylinder D′ carries two sets of contacts $c$ and $d$. In the power positions of the main cylinder D it is necessary that the contacts $c$ should be in engagement with the corresponding fixed contacts 24′ to 37′, inclusive, and in the braking positions of the main cylinder D it is necessary that the set of contacts $d$ should be in engagement with the fixed contacts 24′ to 37′. In the particular controller chosen for illustration in this case the cylinders RS and D′ are mounted upon a common shaft, the cylinder D′ being loose thereon. By a suitable cam connection whenever the main controller-cylinder D is moved toward its first power position the cylinder D′ is moved so as to bring the contacts $c$ into engagement with the fixed contacts 24′ to 37′, where it remains until the controller is again moved to its "off" position, and whenever the controller-cylinder D is moved toward its first braking position the cylinder D′ is thrown into such a position as will bring the contacts $d$ into engagement with these same contacts, there to remain so long as the cylinder D is in any one of its braking positions. Supposing the reversing-switch cylinder RS to be so thrown that the contacts of the set $a$ engage with the fixed contacts 16' to 23', the first movement of the main cylinder D to the left will cause the set of contacts $d$ on the cylinder D' to be brought into engagement with the corresponding fixed contacts adjacent thereto, and in the first braking position of the main cylinder D, when the contacts 1' to 14', inclusive, lie along the line 1 1, the circuit connections for the motors and brake-shoes may be traced as follows: Starting from the brushes marked $+$ of the motor-armatures A' A$^2$, one circuit leads from the $+$ brush of the armature A' through the conductor 21 and the contact 21' to the contact 20', thence to contact 26' and through cross-connected contacts in the set $d$ on the cylinder D' to the contact 28' and the conductor 28. The other circuit leads from the $+$ brush of the armature A$^2$ through conductor 17 and the contact 17' to the contact 16', thence to the contact 37' and through cross-connected contacts of the set $d$ on the cylinder D' to the contact 30', where it joins the other circuit in the conductor 28. The circuits thus far described constitute the connection (shown in Fig. 3) joining the positive brushes of the two armatures. From the conductor 28 the circuit leads to the conductor 38 and through the brake-shoes B$^2$ and B', the conductor 40, and a portion of conductor 14 to conductor 31, thence through contact 31' and a contact of the set $d$ on the switch D' to the two contacts 32' and 33', where the circuit divides, one branch leading from the contact 32' through the conductor connected therewith and field-winding F' to the conductor 13 and the other leading from contact 33' through the conductor connected therewith and the field-winding F$^2$ to conductor 11. The conductors 11 and 13 are connected to each other and to the conductor 12 through the contacts 11' 12' 13' and the corresponding movable contacts on the cylinder D. From the contact 12' the circuit continues through the conductor 12 to the conductor 27, contact 27', through cross-connected contacts of the set $d$ on the cylinder D' to contact 25', and thence through conductor 1 to contact 1' of the main switch D, through cross-connected contacts 1$^a$ to 8$^a$ of said switch to the contact 8', thence by way of conductor 8 to one terminal of the resistance R, through all the sections of the said resistance to the conductor 2, thence by way of conductor 36, contact 36', and one of the contacts of the set $d$ on the switch D' to the contacts 35' and 34', from each of which a circuit leads to the brush of one of the motor-armatures A' and A$^2$, these circuits being traced as follows: starting from the contact 35', through the contact 19' of the reversing-switch RS to the contact 18', thence by way of conductor 18 to the $-$ brush of the armature A$^2$, the other circuit starting from contact 34', leading through contact 23' of the reversing-switch RS to contact 22', and thence by way of conductor 22 to the $-$ brush of the armature A'. The later braking positions of the cylinder D operate to successively cut out the sections of the resistance R, until in the final braking position of the controller this resistance is entirely short-circuited. In order to reduce the braking effect of the brake-shoes in the last few braking positions, a movable contact 14$^a$ is provided on the switch-cylinder D, coöperating with fixed contacts 14' 15'. When the fourth braking position of the cylinder D has been reached, the movable contact 14$^a$ will bridge the contacts 14' and 15', thus connecting the resistance $r$ between the conductors 38 and 40, and therefore across the terminals of the brake-shoe circuit. In the subsequent braking positions of the controller this resistance is maintained in the circuit. The resistance $r'$ is not used in braking, but is used in the first power position of the controller for demagnetizing the brake-shoes. Inasmuch as the present invention does not depend upon any particular system of control of the motors when supplied with power, the operation of the controller in its power positions will not be described.

In Figs. 2 and 3 I have illustrated a circuit connection of the brake-shoes such that they are included in series in circuit between the equalizers joining the terminals of the armature and field windings of the motors. It will be understood, however, that my invention does not depend on any particular position of the brake-shoes in the circuit or any particular circuit connections.

In Fig. 1 I have shown one truck provided with motors only and the other provided with brake-shoes, and in such an arrangement my invention will be applied so as to equalize the braking effects of the motors and the brakes or, in other words, so as to render the braking effect of the brakes substantially equal to the braking effect of the motors irrespective of the speed. In its broadest aspect, however, my invention contemplates equalizing the braking effects of the various trucks which are used in braking, and whatever arrangement of motors and brakes is used the brakes will be adjusted to this end. In many installations it is customary to provide brake-shoes on the motor-axles as well as on the free axles. In such case the brake-shoes on the motor-axles may or may not be provided with my regulating means; but in case they are not thus provided the braking effect of the motor-axles will evidently vary somewhat with the speed, and in such case the shoes on the free axles will be adjusted not to produce a braking effect equal to the braking effect of the motors irrespective of the speed, but a braking effect which varies in the same manner as that on the motor-axles. It will therefore be evident that many changes may be made in the particular arrangements described without departing from the spirit and scope of my invention.

What I claim as new, and desire to secure by Letters Patent of the United States, is—

1. In combination, in a vehicle or train having a plurality of trucks equipped with motors and electrically-actuated brakes, means for connecting the motors so that they may operate as momentum-driven generators supplying current to actuate the brakes, and means whereby the magnetization of the brake-actuating devices may be reduced, as the speed of the vehicle or train decreases, without reducing by a corresponding amount, the current generated by the motors.

2. In combination, in a vehicle or train, a plurality of trucks, a motor or motors on one of said trucks, an electrically-actuated brake or brakes on another of said trucks, means for connecting the motors so that they may operate as momentum-driven generators supplying current to actuate the brakes, and means for equalizing the braking effects of the said trucks.

3. In combination in a vehicle or train, one or more electrically-actuated brakes, one or more motors connected so that they may operate as momentum-driven generators supplying current to actuate the brakes, and means whereby the current flowing in the brake-energizing windings may be reduced, as the speed of the vehicle or train decreases, without reducing by a corresponding amount, the current generated by the motors.

4. In combination in an electric braking system for a vehicle or train, one or more motors operating as generators driven by the momentum of the vehicle or train, one or more electrically-actuated brakes, means for connecting the actuating-windings of the brakes in circuit with the motors, and means for shunting said windings at low speeds to prevent skidding of the wheels as the vehicle or train comes to rest.

5. In combination in an electric braking system for a vehicle or train, one or more motors adapted to operate as momentum-driven generators, one or more electrically-actuated brakes, a resistance adapted to be connected in shunt to the brake-actuating windings to divert a portion of the current therefrom so as to prevent skidding of the wheels, means for connecting the actuating-windings of the brakes in circuit with the motors, and means for connecting the said resistance in shunt to said actuating-windings.

6. In combination in an electric braking system for a vehicle or train, one or more motors arranged to be operated as momentum-driven generators, one or more electrically-actuated brakes, and a controller having contacts arranged to connect the actuating-windings of the brakes in circuit with the motors, and other contacts arranged to connect a resistance in shunt to the brake-actuating windings in certain positions of the controller, in order to divert a portion of the current from said windings.

7. In combination in an electric braking system for a vehicle or train, one or more motors arranged to be operated as momentum-driven generators, one or more electrically-actuated brakes, and a controller having contacts arranged to connect the actuating-windings of the brakes in circuit with the motors, and to vary the resistance of said circuit, and other contacts arranged to connect a resistance in shunt to the brake-actuating windings in the final positions of the controller.

8. In combination in an electric braking system for a vehicle or train, one or more motors operating as generators driven by the momentum of the vehicle or train, one or more electrically-actuated brakes, a controller for connecting the actuating-windings of the brakes in circuit with the motors and for varying the resistance of said circuit, and means for shunting the brake-actuating windings in the last braking positions of the controller.

In witness whereof I have hereunto set my hand this 3d day of July, 1900.

FRANK E. CASE.

Witnesses:
BENJAMIN B. HULL,
MARGARET E. WOOLLEY.